Feb. 7, 1933.  G. FARAGO  1,896,230
COMBINED COFFEE ROASTER, GRINDER, AND URN
Filed Jan. 3, 1931  3 Sheets-Sheet 1

Inventor
Guglielmo Farago

By Clarence A. O'Brien
Attorney

Feb. 7, 1933.  G. FARAGO  1,896,230
COMBINED COFFEE ROASTER, GRINDER, AND URN
Filed Jan. 3, 1931  3 Sheets-Sheet 2

Inventor
Guglielmo Farago
By Clarence A. O'Brien
Attorney

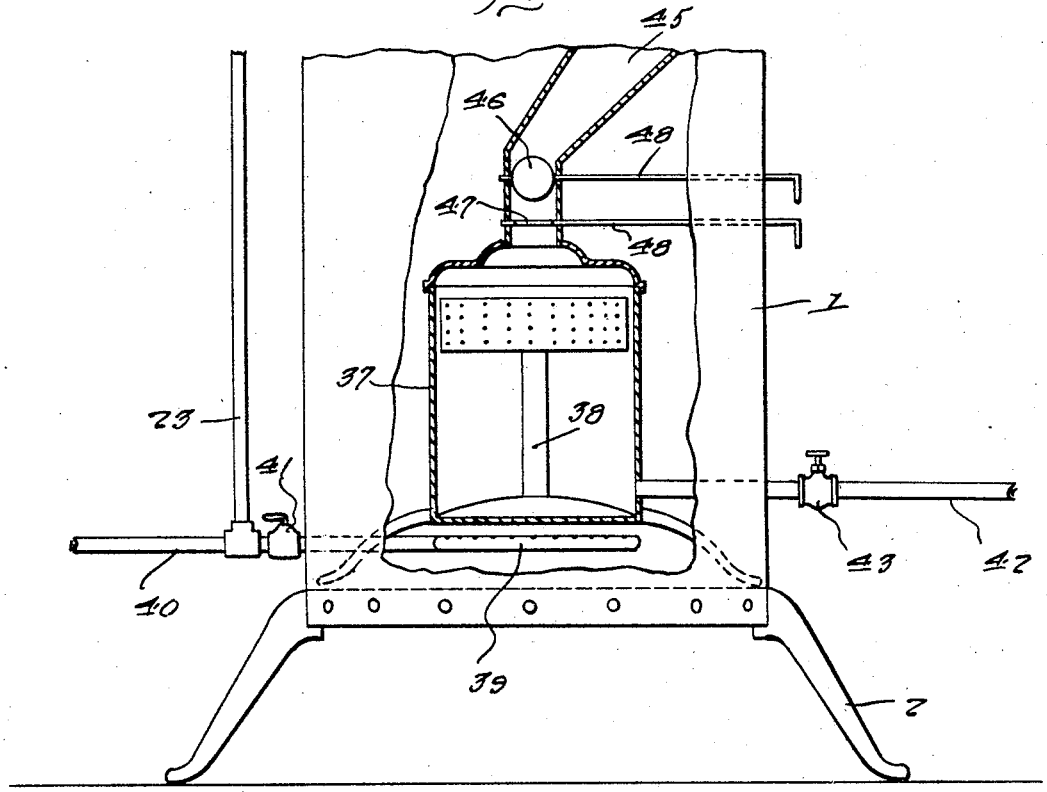
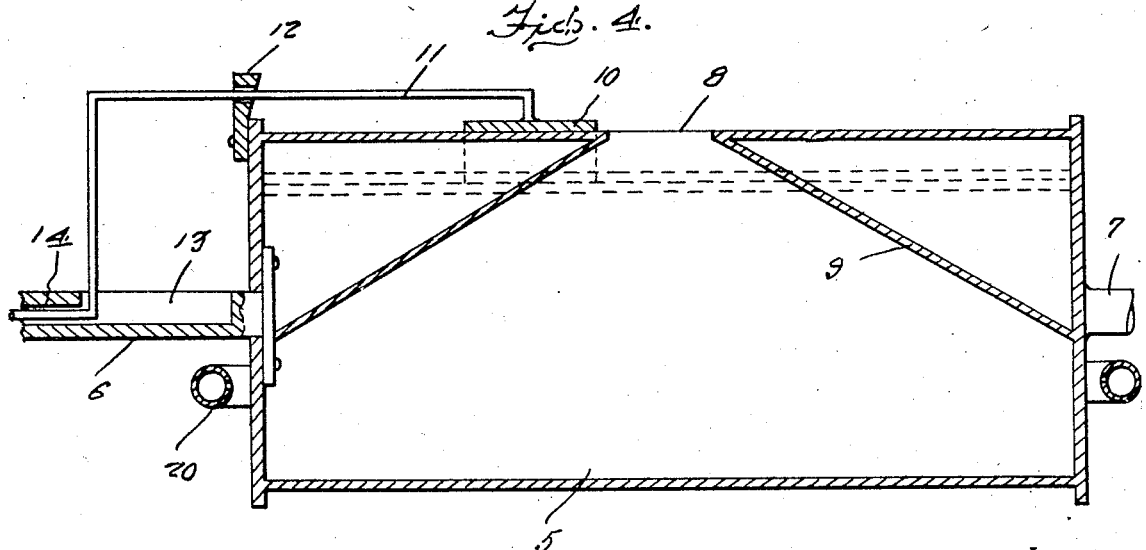

Patented Feb. 7, 1933

1,896,230

UNITED STATES PATENT OFFICE

GUGLIELMO FARAGO, OF NEW YORK, N. Y.

COMBINED COFFEE ROASTER, GRINDER, AND URN

Application filed January 3, 1931. Serial No. 506,444.

This invention relates to a device for roasting and grinding coffee and an urn for boiling the coffee after the same has been ground, the general object of the invention being to provide means, contained in the one device, for producing a beverage of the finest quality, due to the fact that the coffee is roasted and ground just before being placed in the percolator so that the beverage is made from freshly roasted ground coffee.

This invention also consists in certain other features of construction and in the combination and arrangement of the several parts, to be hereinafter fully described, illustrated in the accompanying drawings and specifically pointed out in the appended claims.

Figure 1:
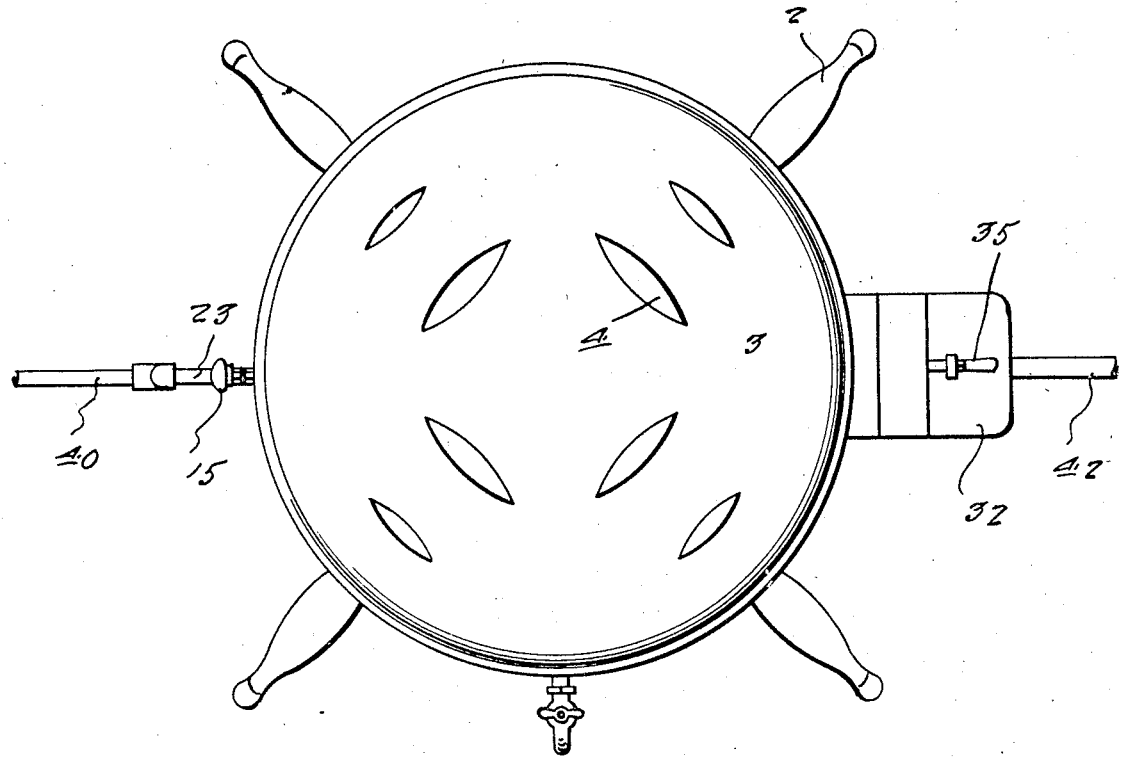
Figure 3:
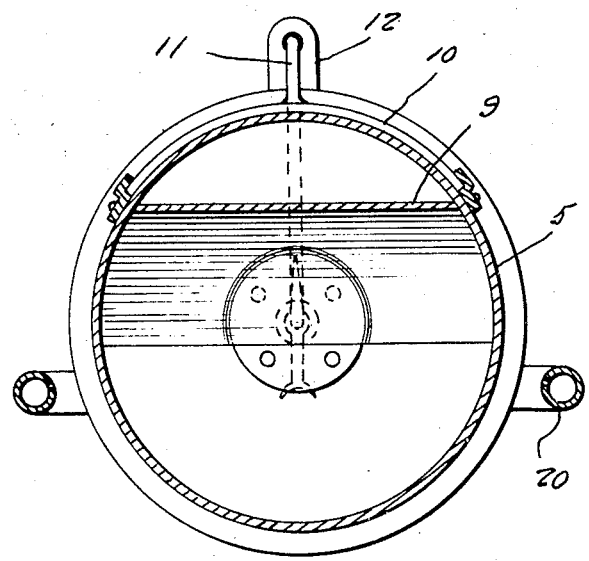
Figure 6:
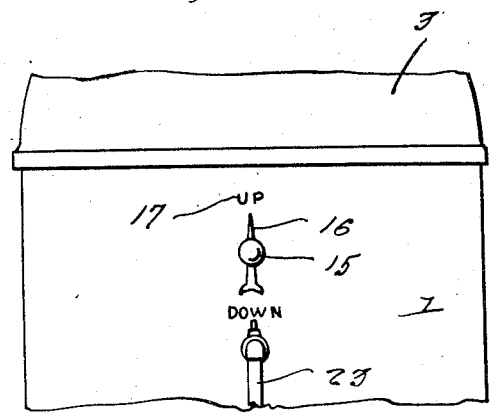
Figure 2:
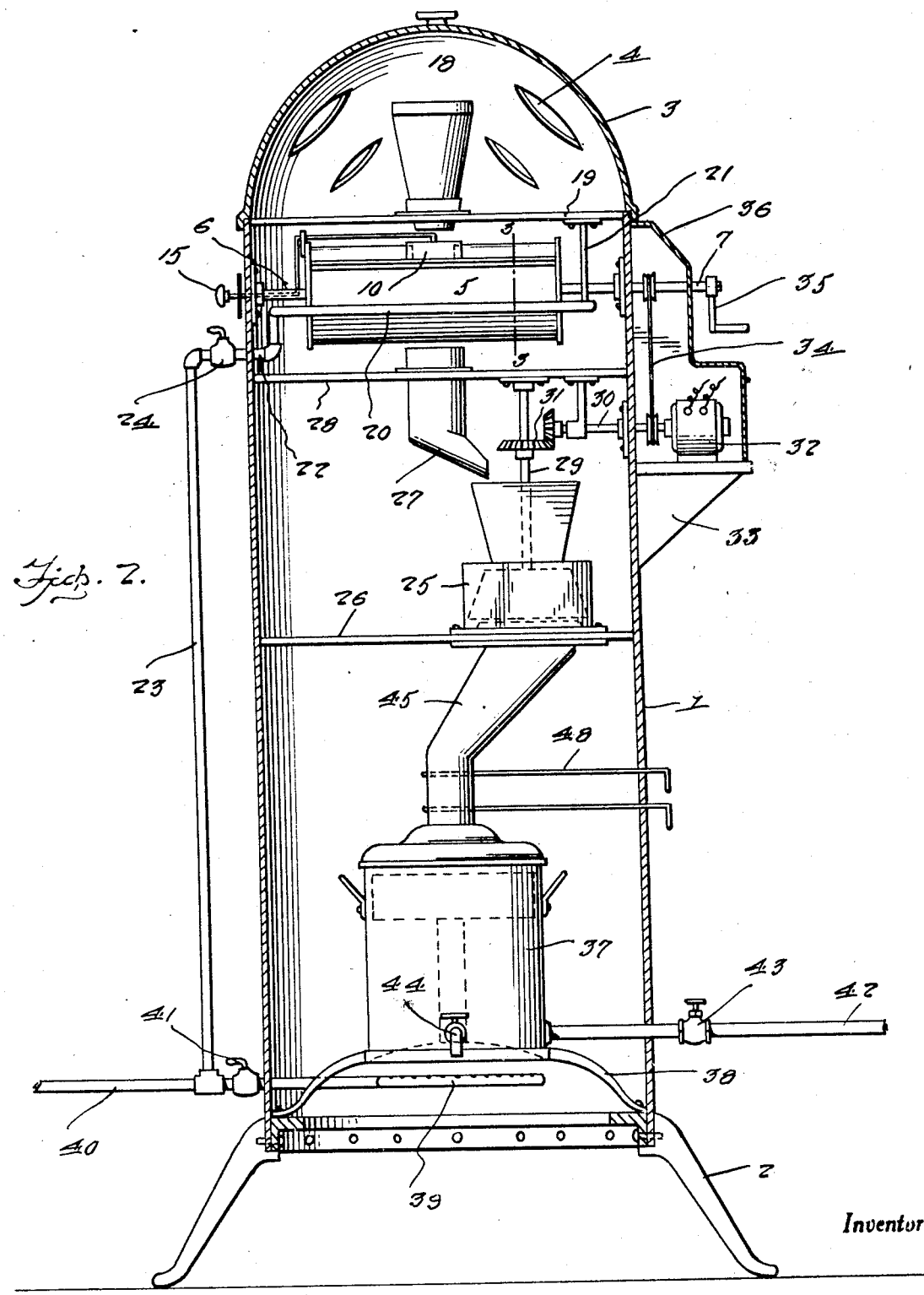

In describing the invention in detail reference will be had to the accompanying drawings wherein like characters denote like or corresponding parts throughout the several views, and in which:

Figure 1 is a top plan view of the device.
Figure 2 is a longitudinal sectional view.
Figure 3 is a section on line 3—3 of Figure 2.
Figure 4 is a vertical sectional view through Figure 3.
Figure 5 is an elevation of the lower part of the device with parts in section to show the percolator.
Figure 6 is a fragmentary elevation showing the indicator means for indicating when the roasting cylinder is in receiving or discharging position.

In these drawings, the numeral 1 indicates a vertically arranged cylindrical casing supported by the legs 2 and having its upper end closed by a removable dome shaped cap 3, said cap being provided with openings 4.

A horizontally arranged roasting cylinder 5 is supported for rotary movement in the top part of the casing through means of the shafts 6 and 7 connected with the ends of the cylinder and passing through the walls of the casing 1. The cylinder 5 is provided with an opening 8 in one side thereof and diagonal partitions 9 are placed in the cylinder for directing the contents thereof to said opening 8 when the cylinder is in a position with the opening lowermost. A sliding cover 10 is adapted to close said opening 8 and this cover has a rod 11 attached thereto, the rod passing through a bracket 12 and is bent to pass into a slot 13 in the shaft 6 and through a bore formed in said shaft with the outer end of the rod extending beyond the casing so that the knob 15 on said outer end can be grasped by the fingers in order to move the rod longitudinally and thus move the cover 10 to open and close position. A finger 16 is fastened to the outer end of the rod and cooperates with the indicia 17 on the casing for indicating when the cylinder is in a position with the opening 8 uppermost or lowermost as clearly shown in Figure 6.

A cross piece 19 extends across the top of the casing and carries a hopper 18, the lower end of which is so positioned that the coffee placed in the hopper will pass through the opening 8 when the cylinder 5 is in position with the opening 8 uppermost.

A burner member 20 surrounds the cylinder and is supported by the hanger 21 at one end thereof and the other end is connected to a pipe 22 which passes through the casing and is connected with a supply pipe 23 which contains a valve 24. Thus this burner will heat the cylinder and coffee therein so as to roast the coffee.

A grinding device 25 of any suitable type is supported by the cross piece 26 in the casing 1 and the chute 27 supported by the cross piece 28 is adapted to convey the roasted coffee from the cylinder 5 into the device so that the roasted coffee can be ground. The shaft 29 of the grinding device is connected to a shaft 30 by the gears 31 and a motor 32 is connected to said shaft 30. The motor is supported by a bracket 33 connected with an exterior part of the casing 1 and said shaft is connected by the pulleys and belt shown generally at 34 with the shaft 7 so that the motor will also operate the roasting cylinder.

A handle 35 is also connected to the outer end of the shaft 7 so that the parts can be rotated by hand when desired. A casing 36 encloses the motor and the belts and pulley as shown in Figure 2.

An urn 37 is located in the lower part of the casing and is supported therein by the legs 38. This urn is provided with the usual percolating attachment 38 and the burner 39 is located below the urn and said burner is connected with a supply line 40 with which the pipe 33 is also connected. The supply of gas to the burner 39 is controlled by means of a valve 41 in the line 40. Water is supplied to the urn by the supply pipe 42 containing the valve 43 and the lower part of the urn is provided with a faucet 44 so that coffee can be taken from the urn by opening this faucet. A chute 45 has its lower end connected with the cover of the urn and the upper end of the chute is located under the grinder device so as to receive the ground coffee therefrom and the passage of the ground coffee through the chute is controlled by the two valves 46 and 47 in the lower part of the chute, each valve being provided with a handle 48 which extends through the casing. As shown in Figure 5 the valves are placed close together so as to provide means for admitting a certain amount of ground coffee to the urn for as will be seen by closing the valve 47 and opening the valve 46 to permit the coffee to collect on the valve 47 and then close the valve 46 and open the valve 47, the amount of coffee collecting between the valves will be deposited in the upper part of the percolator attachment 38 in the urn.

From the foregoing it will be seen that by turning the roasting cylinder to a position where the opening 8 is uppermost, which can be ascertained by the finger 16 being opposite the word "up" and then pulling upon the rod 11 to open the valve 10 the coffee placed in the hopper 18 will pass through the opening 8 into the roasting cylinder. The cover 10 is then closed, the burner lighted and the cylinder turned to roast the coffee. After the coffee has been properly roasted the cylinder is turned to a position wherein the opening 8 is in a downward position and then the cover 10 is moved to open position so that the roasted coffee will slide down the members 9, through the opening 8 into the chute 27 and from the chute the coffee will pass into the grinding device 25 where it will be ground. The ground coffee will drop through the chute 45 into the percolating attachment of the urn. By admitting a certain amount of water in the urn by opening the valve 43 and lighting the gas from the burner 39 the beverage will be made in the usual manner and as the coffee has been freshly roasted and ground an excellent beverage will be produced.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:

1. A coffee roaster comprising a casing, a roasting cylinder rotatably mounted in said casing, a plurality of shafts for mounting the roasting cylinder in the casing, one of said shafts having a slot and a bore, said bore extending longitudinally of the shaft to its outer end, a discharge opening in the side of said roasting cylinder, means for opening and closing said opening, and means extending through the aforementioned slot and bore to a point exteriorly of the casing for operating the closing means of said discharge opening.

2. A coffee roaster comprising a casing, a roasting cylinder mounted in said casing, a plurality of shafts for mounting the roasting cylinder in the casing, one of said shafts having a slot and a bore, said bore extending longitudinally of the shaft to its outer end, a discharge opening in the side of the roasting chamber, means for opening and closing said opening, means extending through the aforementioned slot and bore to a point exteriorly of the casing for operating said closing means, and means carried by the shaft upon the exterior of the casing for indicating the position of the discharge opening of the roasting cylinder.

In testimony whereof I affix my signature.

GUGLIELMO FARAGO.